US008874636B2

(12) United States Patent
Tuchman et al.

(10) Patent No.: US 8,874,636 B2
(45) Date of Patent: Oct. 28, 2014

(54) METHOD FOR PROVIDING SUPPORT SERVICES USING CONSUMER SELECTED SPECIALIST AND SPECIALIST RATINGS

(75) Inventors: Kenneth D. Tuchman, Englewood, CO (US); Bruce A. Sharpe, Aurora, CO (US); Henry D. Truong, Chelmsford, MA (US)

(73) Assignee: TeleTech Holdings, Inc., Englewood, CO (US)

( * ) Notice: Subject to any disclaimer, the term of this patent is extended or adjusted under 35 U.S.C. 154(b) by 198 days.

(21) Appl. No.: 13/342,794

(22) Filed: Jan. 3, 2012

(65) Prior Publication Data

US 2013/0173687 A1  Jul. 4, 2013

(51) Int. Cl.
*G06F 15/16* (2006.01)

(52) U.S. Cl.
USPC .............................. 709/202; 705/1.1; 705/7.14

(58) Field of Classification Search
CPC .................................................. H04L 65/1069
USPC .............................. 709/202; 705/1.1, 10, 7.14
See application file for complete search history.

(56) References Cited

U.S. PATENT DOCUMENTS

| 6,212,178 | B1 | 4/2001 | Beck et al. |
| 6,226,623 | B1 | 5/2001 | Schein et al. |
| 6,690,788 | B1 | 2/2004 | Bauer et al. |
| 6,819,759 | B1 | 11/2004 | Khuc et al. |
| 6,934,381 | B1 | 8/2005 | Klein et al. |
| 6,988,126 | B2 | 1/2006 | Wilcock et al. |
| 7,165,213 | B1 | 1/2007 | Busey |
| 7,373,304 | B1 | 5/2008 | Pletz et al. |
| 7,383,358 | B1 | 6/2008 | Kennedy |
| 7,418,092 | B2 | 8/2008 | Brown |
| 7,450,567 | B1 | 11/2008 | Mamnani |
| 7,496,053 | B1 | 2/2009 | Seabaugh |
| 7,558,382 | B2 | 7/2009 | Torres et al. |
| 7,658,327 | B2 | 2/2010 | Tuchman et al. |
| 7,746,362 | B2 | 6/2010 | Busey et al. |
| 7,746,998 | B2 | 6/2010 | Flores et al. |
| 7,761,321 | B2 | 7/2010 | Kannan et al. |
| 7,787,609 | B1 | 8/2010 | Flockhart et al. |
| 7,885,820 | B1 * | 2/2011 | Mancisidor et al. ........... 705/1.1 |
| 2006/0171402 | A1 | 8/2006 | Moore et al. |
| 2006/0218061 | A1 | 9/2006 | Mouline |
| 2007/0041523 | A1 | 2/2007 | Paden et al. |

(Continued)

OTHER PUBLICATIONS

"Afaria OneTouch" iAnywhere Solutions, Inc., Dublin, California, 2005, 2 pages.

(Continued)

*Primary Examiner* — Yves Dalencourt
(74) *Attorney, Agent, or Firm* — Blakely Sokoloff Taylor & Zafman LLP

(57) ABSTRACT

A service center receives a request from a remote device for a live support session of a product supported by the service center, where the service center provides support services for a plurality of products on behalf of a plurality of product providers. In response to the request, the service center determines one or more preferred agents that are known to a user of the remote device and transmits information representing the preferred agents to the remote device to allow the user to select one of the preferred agents for the live support session. In response to a user selection of an agent, a communications session is established between the user and the selected agent to enable the selected agent to provide live support.

16 Claims, 11 Drawing Sheets

(56) References Cited

U.S. PATENT DOCUMENTS

| | | |
|---|---|---|
| 2007/0124161 A1 | 5/2007 | Mueller et al. |
| 2007/0160188 A1 | 7/2007 | Sharpe et al. |
| 2007/0276722 A1 | 11/2007 | Silvera et al. |
| 2007/0293200 A1 | 12/2007 | Roundtree et al. |
| 2008/0074264 A1 | 3/2008 | Sharpe et al. |
| 2008/0140438 A1 | 6/2008 | Bares |
| 2008/0195659 A1 | 8/2008 | Rawle |
| 2009/0171752 A1* | 7/2009 | Galvin et al. .................. 705/10 |
| 2010/0030881 A1 | 2/2010 | Moreira Sa de Souza et al. |
| 2010/0205540 A1 | 8/2010 | Gupta et al. |
| 2010/0241577 A1* | 9/2010 | Geppert et al. ............... 705/304 |

OTHER PUBLICATIONS

"Check Point Provides One-Touch Secure Access to Corporate Data for Mobile Workers" CMP Media LLC, Oct. 28, 2010, downloaded from http://www.darkreading.com/shared/printableArticleSrc.jhtml?artivleID=228000288, Nov. 10, 2010, 2 pages.

International Search Report and Written Opinion mailed Sep. 13, 2013, for International Patent Application No. PCT/US13/20113, 9 pages.

* cited by examiner

| Subject Matter/Skill Set Mapping Table 209 ||||
|---|---|---|---|
| Support Subject Matters | Skill Sets | Agent IDs | Ratings |
| TV | Generic TV | ... | ... |
| HDTV | Generic HDTV | ... | ... |
| HDTV/55 | Generic HDTV | ... | ... |
| HDTV/55/LED | HDTV LED | ... | ... |
| HDTV/55/LED/Calibrate | HDTV LED Calibrate | ... | ... |
| ... | ... | ... | ... |

FIG. 4A

| Agent IDs | User Ratings | Other Information (e.g., history, product, topic) |
|---|---|---|
| ⋮ | ⋮ | ⋮ |
| ⋮ | ⋮ | ⋮ |
| ⋮ | ⋮ | ⋮ |
| ⋮ | ⋮ | ⋮ |

User Agent Preferences
220

FIG. 4B

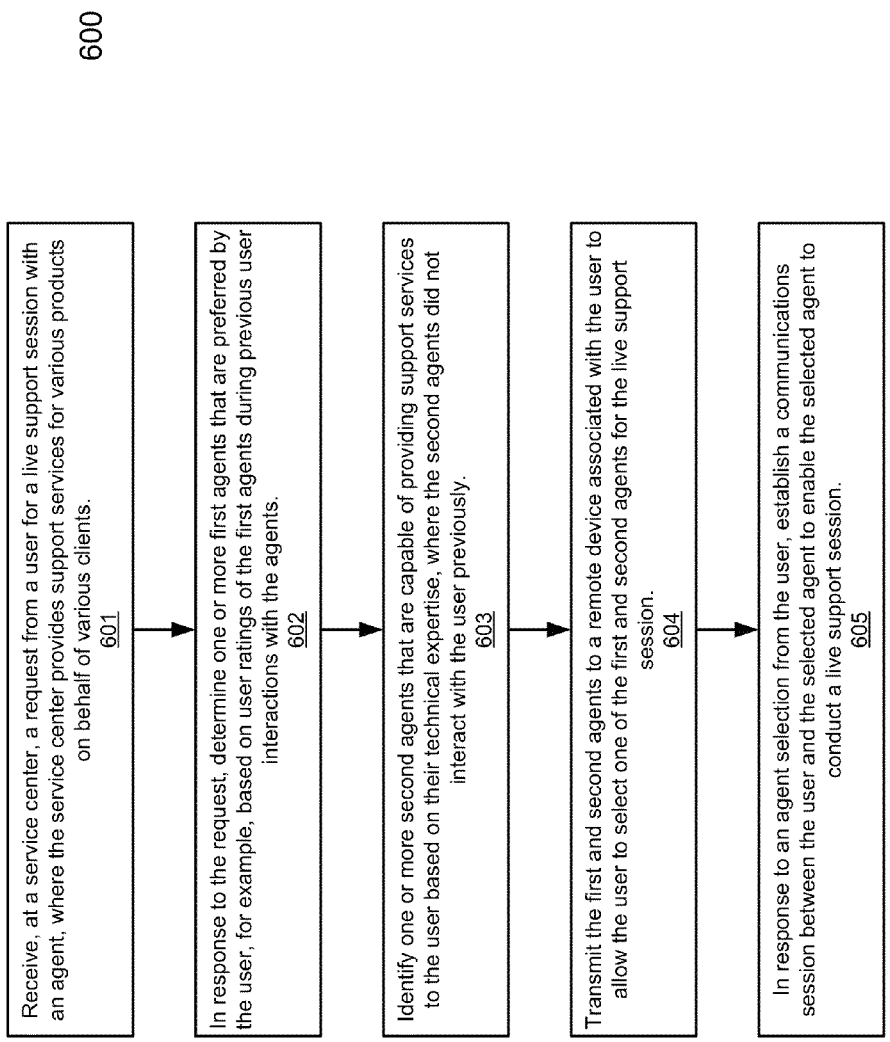

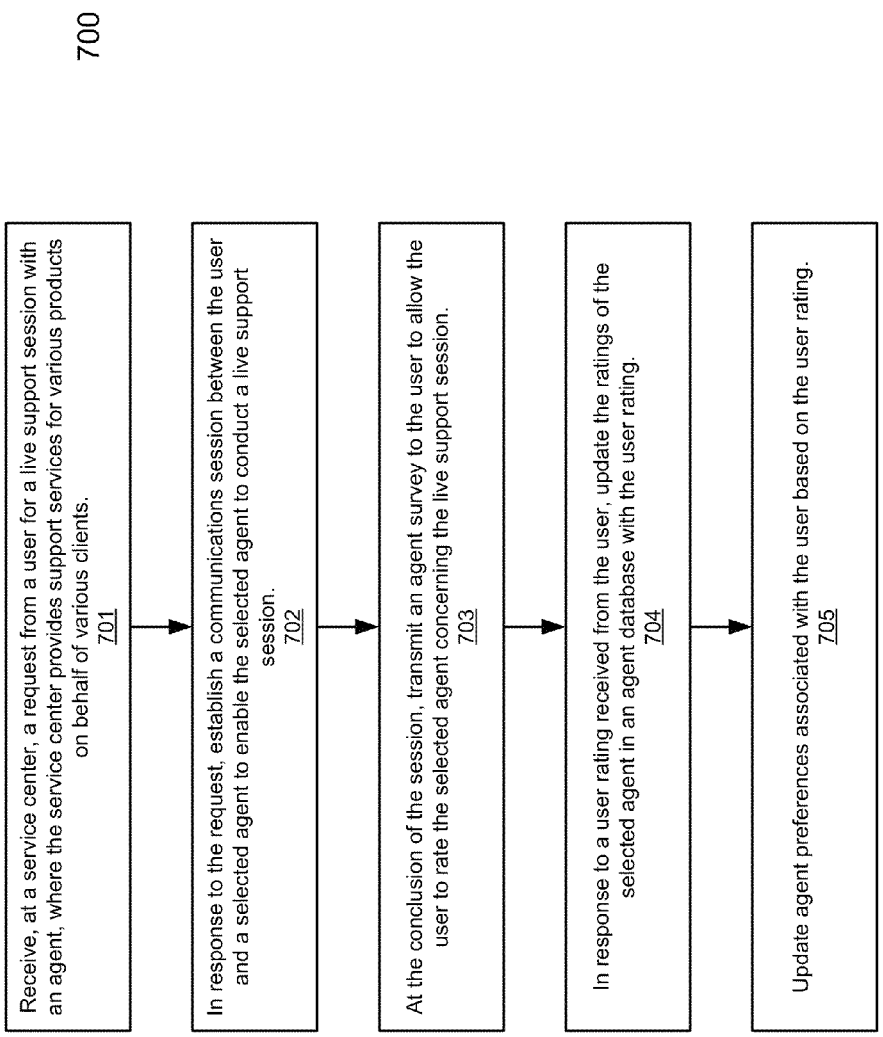

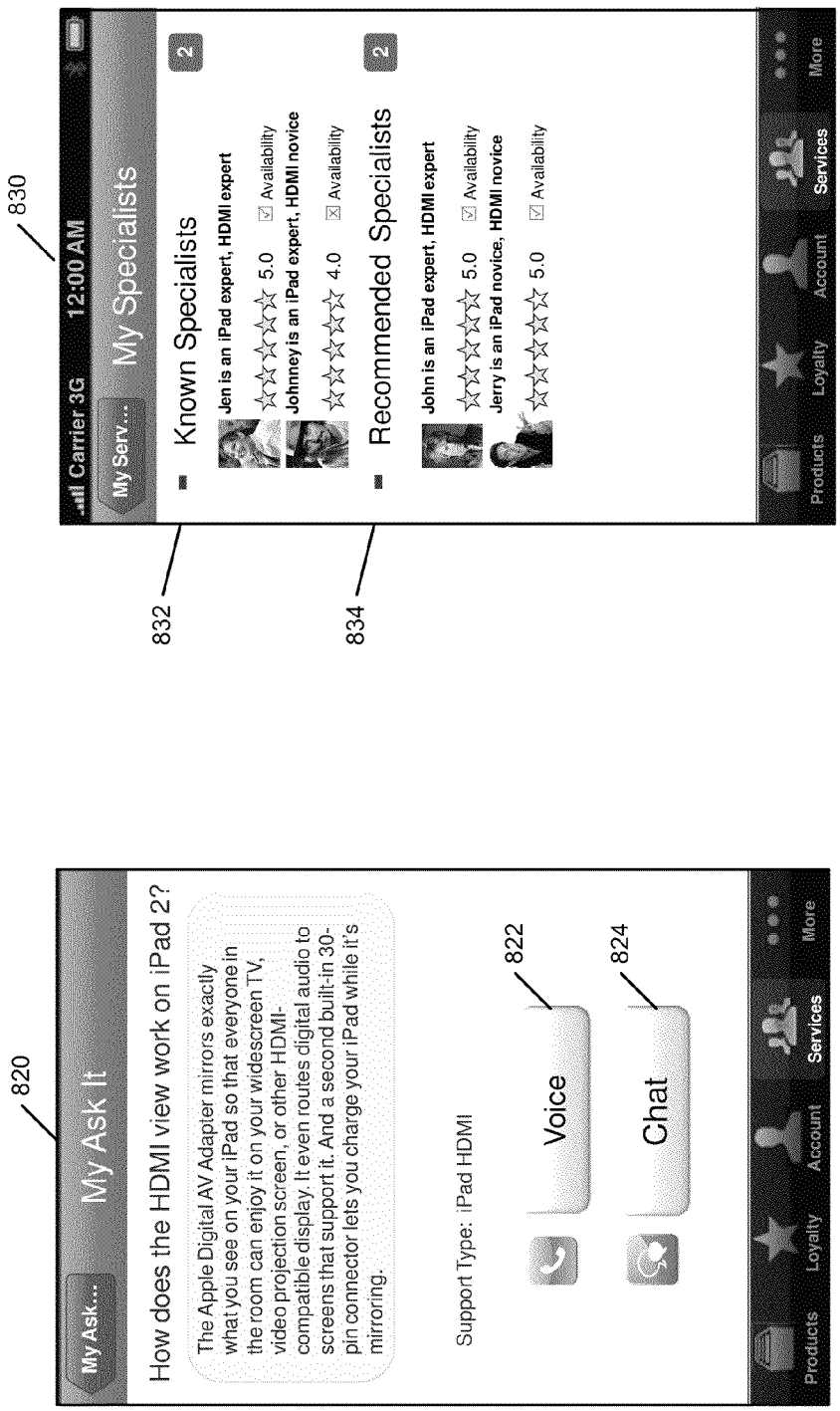

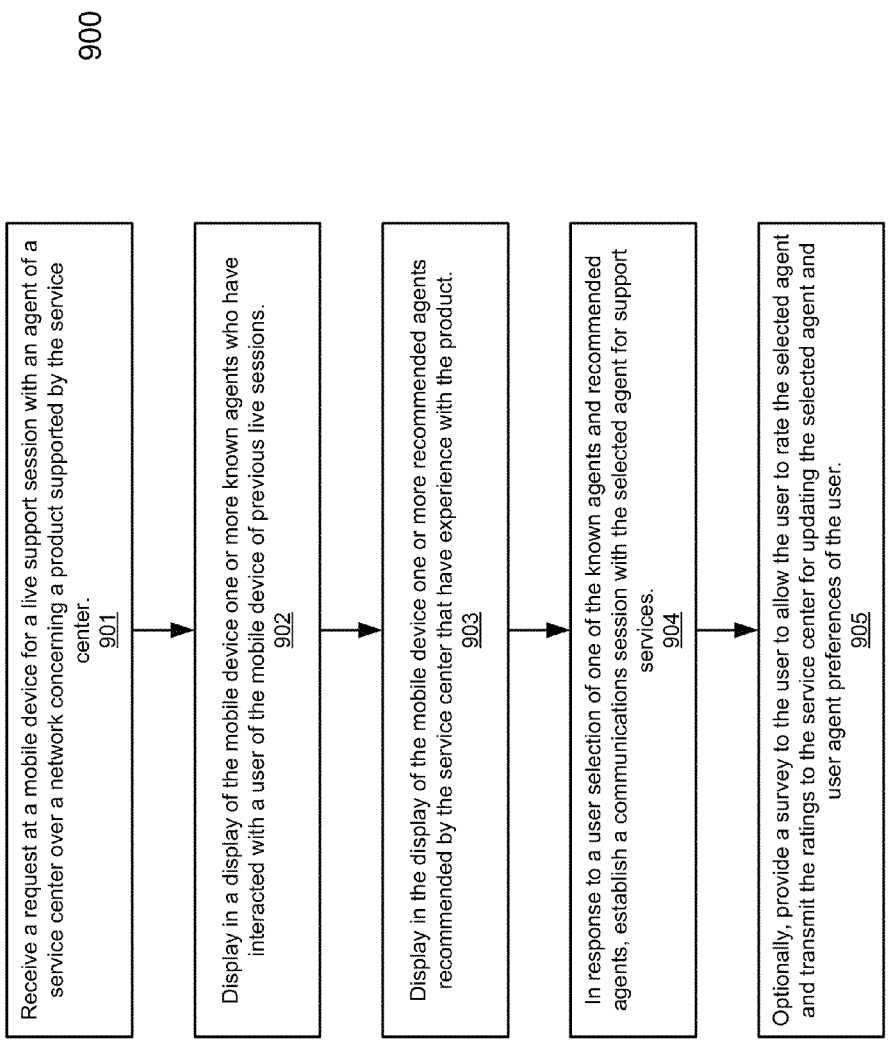

METHOD FOR PROVIDING SUPPORT SERVICES USING CONSUMER SELECTED SPECIALIST AND SPECIALIST RATINGS

FIELD OF THE INVENTION

Embodiments of the present invention relate generally to providing support services. More particularly, embodiments of the invention relate to providing support services using consume selected specialists and ratings.

BACKGROUND

Prior to the advent and prolific use of distributed network environments such as the Internet, customer service sessions typically occurred over a teleconference between a customer service agent or service specialist and a customer. These teleconferences, which incidentally are still very popular today, are initiated by a customer placing a phone call to a customer service agent. The customer service agent's phone receives the call through a public-switched telephone network (PSTN). Many support centers handle a large volume of inquiries, usually by phone, for sales, information, customer support and other services. Typical support centers provide the ability to route multiple incoming, customer-initiated calls to agents which provide sales, information, or support on behalf of an entity interested in establishing or maintaining a relationship with the customer.

Modern support center systems selectively route incoming calls based on a number of factors such as the number called or dialed, the originating number, the queued sequence of the caller, the geographic location of the caller, accumulated caller history, and other relevant criteria. Once the system has evaluated the inbound caller's information, if any, the system searches for an available agent to service the call. Availability of agents may be dependent on any number of factors such as a skill level or a schedule of the agent. The number of agents within the contact center and available to the system may often be limited by the physical space available for the agents to operate. Contact centers have to deal with a limited number of agents to handle a large number of incoming customer calls. Typically, a consumer does not have an option to choose an agent he/she prefers or is familiar with.

BRIEF DESCRIPTION OF THE DRAWINGS

Embodiments of the invention are illustrated by way of example and not limitation in the figures of the accompanying drawings in which like references indicate similar elements.

FIG. 4A is a diagram illustrating an example of a subject matter and skill set mapping data structure according to one embodiment of the invention.

FIG. 4B is a diagram illustrating an example of a user agent preference data structure according to one embodiment of the invention.

FIG. 6 is a flow diagram illustrating a method for providing support services according to one embodiment of the invention.

FIG. 7 is a flow diagram illustrating a method for providing support services according to another embodiment of the invention.

FIGS. 8A-8D are screenshots illustrating examples of graphical user interfaces (GUI) of an application for accessing a service center according to one embodiment of the invention.

FIG. 9 is a flow diagram illustrating a method for providing support services according to another embodiment of the invention.

DETAILED DESCRIPTION

Figure 1:
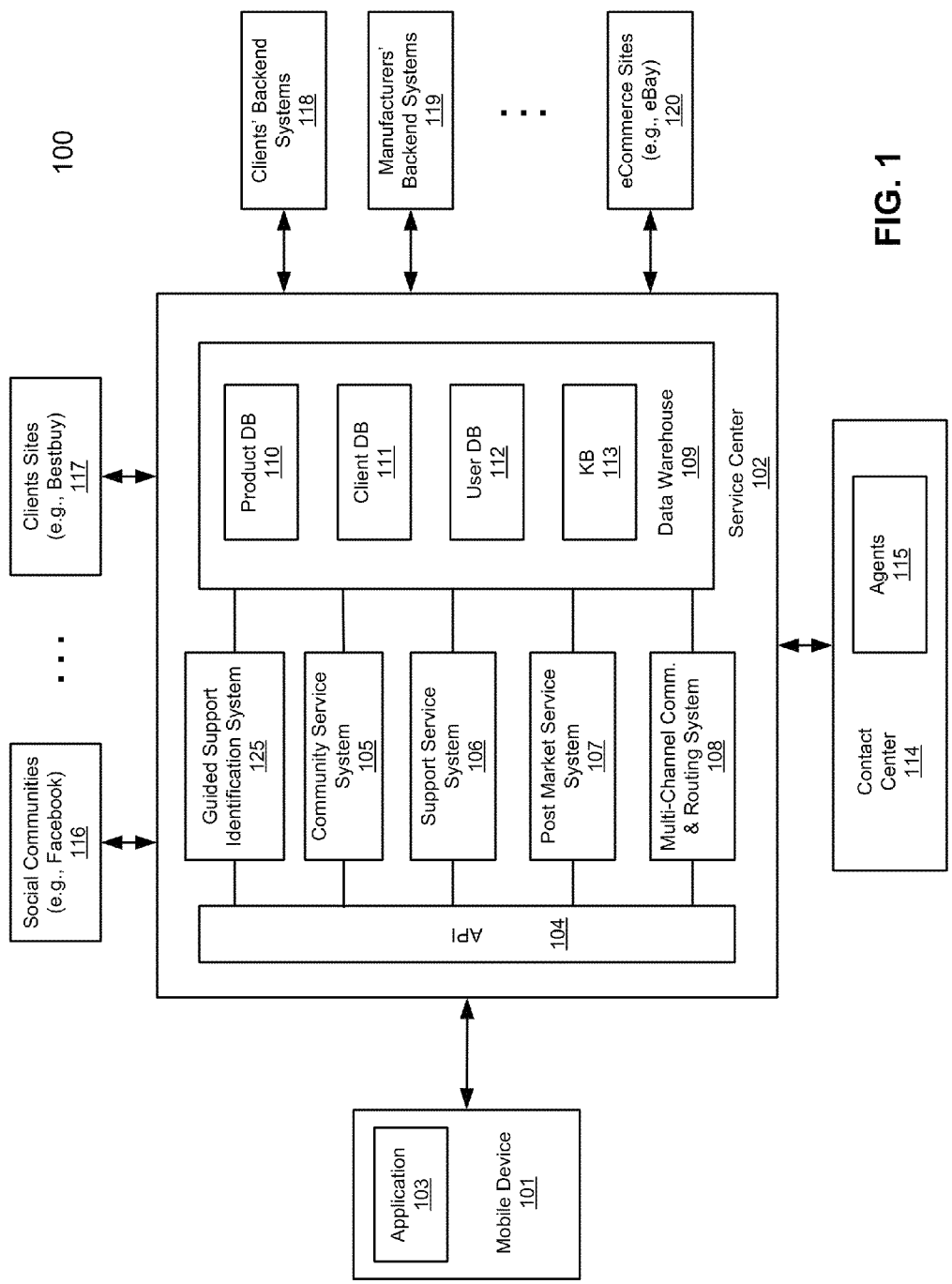
FIG. 1 is a block diagram illustrating a system for providing life cycle services to products according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some aspects, a service center platform utilizes data collected from a user and an intelligent engine to provide guided support identification and routing in order to provide users in need of assistance to a specific skill or expert specialist able to support their request or need. A guided support identification system is implemented within a service center that provides support services to a variety of products or services on behalf of a variety of product or service providers. The guided support identification system is configured to analyze user interaction or behaviors to predict or determine a support subject matter that a user may potentially need. Based on the analysis, one or more agents or specialists are identified to be recommended, as recommended agents, to a user for the current session when there is a need.

In addition, according to one embodiment, the service center maintains information concerning agents that the user has worked with in previous support sessions, including ratings of the agents rated by the user at the conclusions of at least some of the previous support sessions. Based on the user ratings, at least some of the agents that have previously interacted with the user and have a rating higher than a predetermined threshold are identified. That is, the identified agents may be known to the user via the previous interactions and rated relatively high by the user. These agents may be considered as preferred agents by the user.

When the user subsequently requests a live support, for example, within the same user session (e.g., same browser session or same instance of an application), information concerning at least one of the recommended agent and/or at least one of the preferred agents (if there is any) is transmitted from the service center and represented at a remote device (e.g., mobile device) of the user. The user can then select one of the recommended agents or one of the preferred agents to initiate a live support session. Alternatively, the user can simply not to select any of the preferred agents and recommended agents and instead let the system to randomly assign an agent to the user. At the conclusion of the live support session a survey is conducted to allow the user to rate the selected agent and the service center is configured to update the ratings of the selected agent, as well as user ratings of the preferred agent or a potential preferred agent. As a result, when a user initiates a live support session, the user can actively select an agent he/she prefers or is familiar with, which may improve customer satisfaction experience or measures.

FIG. 1 is a block diagram illustrating a system for providing life cycle services to products according to one embodiment of the invention. Referring to FIG. 1, system 100 includes a mobile device 101 of a user, customer, or individual communicatively coupled to service center 102 over a network. The network may be any kind of networks. Mobile device 101 may be any kind of mobile devices including, but is not limited to, a laptop, mobile phone, tablet, media player, personal digital assistant or PDA, etc.

Service center 102 may be implemented in a centralized facility or server. Alternatively, service center 102 may be implemented in multiple facilities or servers in a distributed manner (e.g., cloud-based service platforms). Service center 102 provides services to a variety of products or services from a variety of clients or vendors. A client may be a manufacturer, a distributor, a retailer, a service provider or broker, a purchasing facility (e.g., Amazon™, Expedia™, or ISIS™), or a combination thereof. In one embodiment, service center 102 includes service APIs 104 to communicate with other systems such as mobile device 101, client's site 117, social communities 116, contact center 114 including agents or experts 115, client backend systems 118, manufacturer backend systems 119, eCommerce sites 120 and other auxiliary systems (e.g., billing system). Service center 102 can handle service requests from customers of multiple clients. For example, a service center may handle customer service requests for a number of retail sales companies, sales calls for catalog sales companies, and patient follow-up contacts for health care providers. In such a structure, the service center may receive service requests directly from the customers or through client support management systems.

In one embodiment, service center 102 further includes community service system 105, support services system 106, post market service system 107, and data warehouse 109. Support services system 106 is responsible for handling support services requests from the users, including identifying and registering a product, creating an instance case context, selecting and assigning a customer representative (also referred to herein as an agent, specialist, or expert) to provide support services to the users, and managing work flows, etc. An agent may be selected based on a skill set or expertise of the agent, as well as other factors such as geographic location, of the agent. The term "agent," "specialist," or "expert" refers to a service center personnel or a computerized application, in some cases, that respond to customer requests. An agent may be locally situated at the service center or remotely situated over a network. Throughout this application, the terms of "agent," "specialist," and "expert" are interchangeable terms dependent upon the circumstances. In most cases, the term of "agent" collectively refers to a customer representative, a support agent, a support specialist, a support expert, or a combination thereof, which may be a service center personnel and/or a computerized application. Further detailed information concerning service center 102 and/or support service system 106 can be found in co-pending U.S. patent application Ser. No. 13/085,397, filed Apr. 12, 2011, which is incorporated by reference in its entirety.

In one embodiment, community service system 105 is responsible for communicating with social communities 116 via an API, for example, to post a message received from a user and to route the responses received from social communities 116 back to the user. Post market service system 107 is responsible for handling post market activities associated with the registered products, including selling a registered product on eCommerce sites 120 and arranging a disposal facility to dispose or recycle the product, etc.

According to one embodiment, in addition to registering a product with the service center, a user can also register, for example, through the application running within a mobile device, one or more social communities and/or one or more eCommerce sites by storing the necessary credentials (e.g., usernames and passwords) of the servers hosting the social communities and eCommerce sites in a database (e.g., user database) of the service center, where the database is associated with a user the mobile device. Subsequently, the user can transmit a sales request to sell or dispose a registered product by specifying one or more of the eCommerce sites.

In response to the sales request, post market service system 107 of service center 102 is configured to retrieve the necessary credentials for the specified one or more eCommerce sites and arrange the specified eCommerce sites for selling the product together with the associated credentials to allow the eCommerce sites to authenticate the user for the purpose of selling the product, such that the user does not have to provide the necessary credentials at the point in time of the sales request and the user does not have to provide detailed information of the product to be posted on the eCommerce sites describing the product to be sold. A single sales request received from the mobile device can specify multiple eCommerce sites. The service center can also arrange a disposal facility to dispose (e.g., recycle) a registered product without having a user to specifically contact the disposal facility.

Similarly, a user can also post a message to one or more of the registered social communities from the application running within the mobile device without having to individually access the social communities. In one embodiment, a user can transmit a request from mobile device 101 to service center 102, where the request includes a message to be posted and one or more community identifiers identifying one or more registered social communities. In response, community service system 105 of service center 102 is configured to retrieve the associated credentials from the database and to post the message to the specified social communities together with the associated credentials allow the social communities to authenticate the user, without having to prompt the user for the same credentials. Further detailed information concerning community service system 105 and/or post market service system 107 can be found in co-pending U.S. patent application Ser. No. 13/185,213, filed Jul. 18, 2011, which is incorporated by reference herein in its entirety.

In one embodiment, service center 102 further includes a messaging or advertisement system (not shown) responsible for handling any messages received from a variety of partners or parties, such as client sites 117, client backend systems 118, manufacturer backend systems 119, and eCommerce sites 120. Messages may be related to the registered products of the user, such as, promotions, rewards, and recall messages. Messages may include advertisements from a variety of advertisement providers.

In one embodiment, a user can configure a set of one or more rules to specify whether certain types of messages or advertisements received from vendors or parties (e.g., retailers, manufacturers, social communities, or other advertisement providers), which may or may not be related to a registered product, should be routed to the user. These rules serve as part of message delivery or filtering rules. The service center engages with the related parties to allow the related parties to get in touch with the user by sending certain messages such as product promotions, rewards, and/or recalls, etc. to the user. The service center may send a message to a user via one or more communications channels preferred by the user, which may also be configured as a set of rules and stored in a database associated with the user.

According to another embodiment, an advertisement received from a vendor is delivered by the service center to a mobile device of a user based on a set of delivery rules associated with the user. The advertisement is displayed on a display of the mobile device by an application running therein. In addition, the service center and/or the application are configured to track interactions of the user with respect to the displayed advertisement to determine user behaviors, patterns, or trends in view of the displayed advertisement. An analysis is performed on the user interaction and the result of the analysis may be utilized to configure further advertisement delivery by the service center and/or the vendors.

According to another embodiment, service center 102 is configured to identify users that have at least one common product registered with the service center and are also members of a social community. The service center is configured to send a message to those users to invite them to connect (e.g., becoming friends or following a friend) with each other via the social community. The social community is hosted by a third party and communicatively coupled to the service center over a network. The service center may also deliver messages or items posted by one of those users to another one of those users on behalf of the social community, without requiring such users to individually or directly accessing the social community. The service center can also deliver messages or items to a particular user posted by other users of the social community, where the messages or items are related to a registered product of that particular user.

According to a further embodiment, an application running on a mobile device provides a user friendly graphical user interface (GUI) to allow a user to configure a set of one or more delivery rules concerning whether certain types of messages or advertisements should be received at the mobile device from a service center. The service center is configured to deliver messages or advertisements on behalf of a message or advertisement provider, which can be a client to the service center, a retailer, a manufacturer, a social community, or other content providers. A user can utilize the GUI to configure, for each of the providers, whether a message associated with a particular registered product of the user or all products in general related to the provider should be received by the mobile device. The settings of the delivery rules are then transmitted from the mobile device to the service center to allow the service center to deliver subsequent messages or advertisements on behalf of the message or advertisement providers accordingly. Further detailed information concerning the advertisement system can be found in co-pending U.S. patent application Ser. No. 13/185,309, filed Jul. 18, 2011, which is incorporated by reference herein in its entirety.

In one embodiment, data warehouse 109 includes product database 110, client database 111, user database 112, and knowledgebase 113. Product database 110 is configured to store any data related to the registered products including user manuals, etc. Client database 110 is configured to store information related to clients such as client's preferred communications mechanisms. User database 112 is used to store information related users, such as, for example, registered products associated with a user, communications channel preference of a user, credentials necessary for a user to access other sites, and/or messaging filtering settings of a user, etc. Knowledgebase 113 is used to store knowledge collected and compiled over a period of time, which can be used by agents 115 and/or users for self-support purposes.

In one embodiment, service center 102 further includes a multi-channel communication and routing system 108 to provide one or more communication channels to any user or client to concurrently access service center 102. Examples of communication channels include email, chat, texting (e.g., short messaging services or SMS), voice (e.g., automated IVR, real-time, or VoIP), video, Web (e.g., Web conferencing), and/or online community forum (e.g., Facebook™ or Twitter™), etc. Note that the multi-channel communication and routing system 108 may be fully or partially integrated with service center 102 or alternatively, it may be maintained or provided by a third party or partner (e.g., communicatively coupled via service API 104 over a network). Service center 102 further includes an automatic caller distribution (ACD) system (not shown) to receive, route, and manage voice calls exchanged via the multi-channel communication system. A customer can obtain support services from service center 102 via a variety of communication mechanisms. A customer can initiate a support request to contact a live agent such as agents 115 in a live manner. Alternatively, a customer may browse certain knowledgebase, such as KB 113 via a Web interface, in an attempt to find a solution to a problem of a product he/she purchased from a manufacturer via a client of service center 102.

According to one embodiment, application 103 is installed on mobile device 101 of a customer or user, where application 103 can serve as a central service point to service center 102 that provides support services to a variety of products or services provided by a variety of vendors. The vendors can be, for example, manufacturers, distributors, retailers, service brokers, purchasing houses, etc. of the products. Vendors may be the clients of service center 102 or entities having a business relationship with service center 102. A user (also referred to herein as a customer) can activate application 103 from the user's mobile device 101 to reach agents 115 the service center 102 or KB data center 113 via a variety of communication channels or media, such as, for example, email, chat, voice (including automated interactive voice recognition or IVR, voice over Internet protocol or VoIP), video, Web, and/or online community-based forum, etc. Application 103 can be a thin/thick client application or a Web-based application.

According to one embodiment, service center 102 further includes guided support identification system 125 configured to analyze user interaction or behaviors to predict or determine a support subject matter that a user may potentially need. Such a support subject matter may be determined based on user interaction while a user is navigating a presentation provided by a remote device such as a Web site or an application running at computing device 101, where the presentation (e.g., application 103) includes information describing a possible solution to a problem of a product or service, which may be related to or similar to a product or service the user is interested in.

The user interaction may be captured (e.g., by a capturing logic integrated within or accessible by the presentation) at the remote device and transmitted to guided support identification system 125 over a network while the user is navigating the presentation at remote device 101. Based on the predicted subject matter (also referred to as a support type), a skill set (also referred to as a skill route) that is required to provide support services of the subject matter is identified. When the user subsequently requests a live support, for example, within the same user session, an agent having the identified skill set is selected to provide support services to the user. The user interaction may be periodically captured and transmitted to the service center during navigation of the presentation. In response, guided support identification system 125 is configured to automatically update and maintain the subject matter determined based on the latest user interaction prior to the user's request for a live support.

As a result, the guided support identification system is able to get users in need of assistance to a specific skill or expert specialist that is able to support their request or need, even before the user initiates a live support. Once the support subject matter and the required skill set have been identified, a route context (e.g., touch plan) can be generated by support service system 106 as described in the above incorporated-by-reference applications, where the routing context includes all the necessary information an agent needs in order to provide the best support services to the user. Such an agent is referred to herein as a recommended agent recommended by the service center. A communications session is then established by multi-channel communications and routing system 108 and the routing context is routed to the selected agent. Further detailed information concerning guided support identification system 125 can be found in co-pending U.S. patent application Ser. No. 13/213,002, filed Aug. 18, 2011, which is incorporated by reference herein in its entirety.

According to one embodiment, guided support identification system 125 is configured to maintain which agents a particular user has interacted with during previous support sessions and to store such information in a user database associated with the user. Such information may include user ratings of the agent by the user or other users, subject matters of the previous support sessions, or others. Some of these agents (e.g., those rated relatively high by the user) may be considered as preferred agents by the user dependent upon their respective ratings and/or other factors. When a user initiates a subsequent support session such as a live support session, information concerning one or more recommended agents provided by guided support identification system 125 and/or one or more preferred agents retrieved from the user database are transmitted from service center 102 to remote device 101 to be presented to the user. The user can select one of the recommended agents and preferred agents to establish a live support session. Alternatively, the user can simply not select any of the preferred agents or recommended agents and instead let the system randomly assign an agent to the user.

In one embodiment, guided support identification system 125 includes a survey module to provide a survey to a user at the conclusion of a support session to allow the user to provide a feedback or rating concerning a quality of the agent. The feedback or rating information is also stored (e.g., as a new preferred agent) or updated (e.g., updating ratings of an existing preferred agent) in a user database associated with the user, as well as general agent databases shared amongst other users. Such feedback or ratings from the user may affect subsequent selections of the subsequent preferred agents and/or recommended agents by guided support identification system 125. As a result, when a user initiates a live support session, the user can actively select an agent he/she prefers or is familiar with, which may improve customer satisfaction experience or measures.

Note that a service center described throughout this application is not limited to a traditional service center or support center, nor is it implemented in a single physical location. A service center described herein represents a collection of service logic or providers communicatively coupled to each other over a network in a distributed or a cloud-based fashion. The term of a service center herein represents any kind of service providers that provide a variety of services to customers or users. As described throughout this application, a service center can be a set of enabling cloud-based service APIs, which enable a variety of consumer product services and support offerings via an intelligent set of technologies providing automated and/or live communications. In one embodiment, services provided by a service center can include, but not limited to: 1) user, product, and loyalty registration and support services; 2) product wish list, reviews, and comparisons; 3) purchasing and accessorizing services; 4) social community support and integration services; 5) intelligent knowledge support services; and 6) integrated sales and product disposition services, etc.

Also note that an agent, an expert, or a customer representative described throughout this application is not limited to a real person. The term of an agent, an expert, or a customer representative can also refer to any processing logic or functional block that is configured or programmed to provide automated services to a customer, for example, via services APIs of the service center, without a need of a real person involved. Such processing logic and/or functional blocks can be implemented in software, hardware, or a combination thereof.

Figure 2:
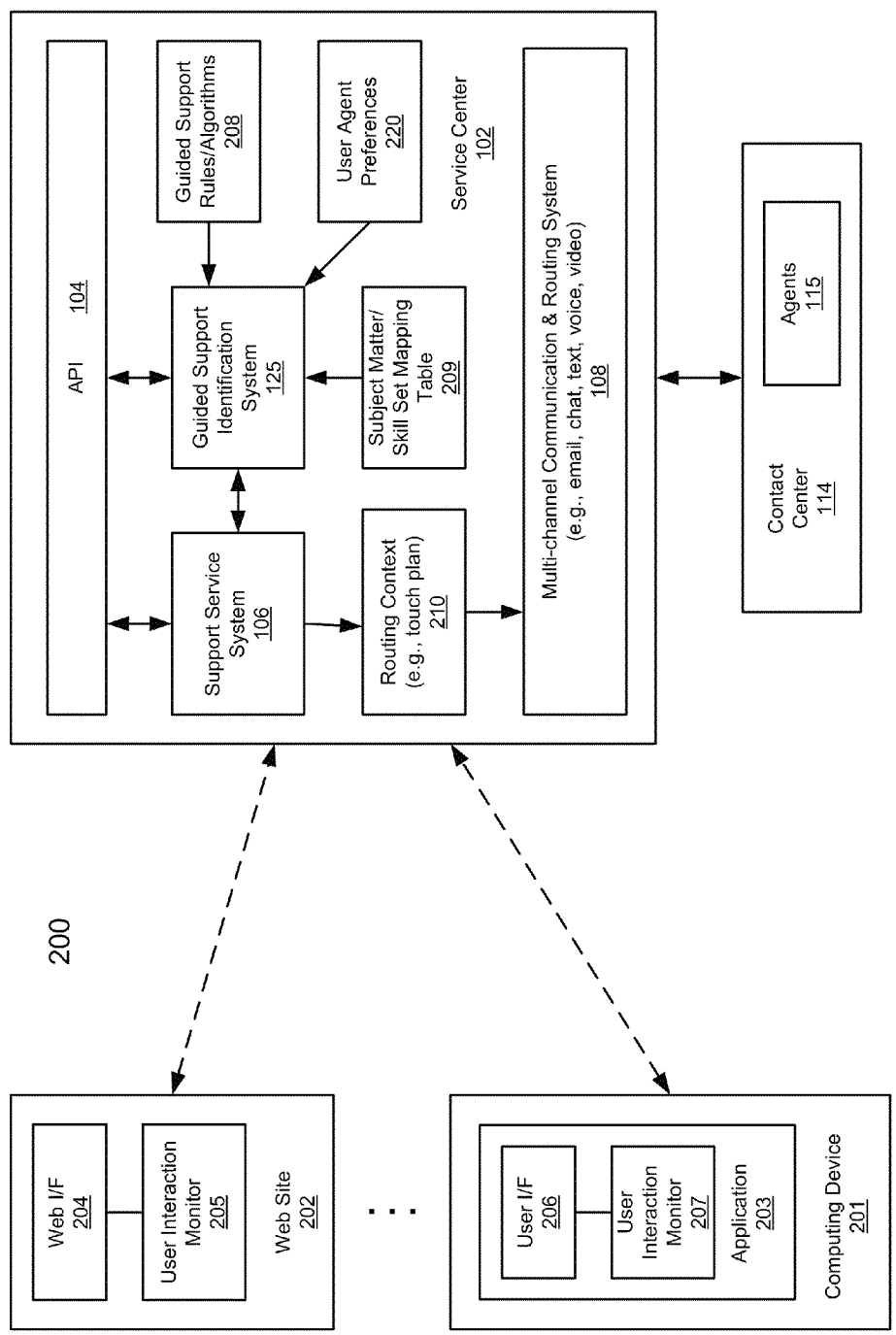
FIG. 2 is a block diagram illustrating an example of a service center according to another embodiment of the invention.

FIG. 2 is a block diagram illustrating a guided support identification system according to one embodiment of the invention. System 200 may be implemented as part of system 100 of FIG. 1. Referring to FIG. 2, service center 102 includes API 104 to allow remote devices such as device 201 or Web server 202 to access resources or services provided by service center 102 over a network. Device 201 may be implemented as part of device 101 and application 203 may be implemented as part of application 103 of FIG. 1. User interaction monitor 207 is configured to monitor and capture user interaction with a representation via user interface 206. A presentation may be an article describing a possible solution to a problem of a product that may be related to a product of the user. For example, a presentation may be retrieved from a self-support knowledgebase such as KB 113 of FIG. 1. Similarly, a user may browse a Web page presented via Web interface 204 of Web site 202 to attempt finding a solution to its problem. User interaction with the Web page may be monitored and captured by user interaction monitor 205. Web site 202 may be implemented as part of client's Web site such as client's sites 107 of FIG. 1. Alternatively, Web site 202 may be maintained by service center 102 via a Web interface.

Typically, a user may want to browse the self-support knowledgebase in an attempt to find a solution to a product of its own. When the user cannot find a solution from the presentation or cannot fully understand the presentation, the user may want to initiate a live support service with an agent. During navigation of the presentation and prior to initiating a live support, for the purpose of illustration only, user interaction monitor 205 is configured to monitor and capture user interaction with the presentation and to transmit the captured user interaction to service center 102. The captured information may further include information identifying the article or subject matter of the article being navigated and/or specific sections, links, or paths within the article that the user interacts, as well as user actions (e.g., information searched, click, tap, or entered in an input field), etc.

In response to the user interaction received via API 104, guided support identification system 125 is configured to analyze the user interaction to determine a subject matter or support type that the user may potentially need based on guided support rules or algorithms 208. In one embodiment, guided support rules 208 are specifically configured and tailored to content of a presentation presented at the remote device, a subject matter, links, or paths of the presentation, and/or a client associated with the presentation (e.g., a product provider of a product described in the article). Once the support type has been determined, guided support identification system 125 is configured to determine a skill set that is required to provide support services associated with the support type. In one embodiment, guided support identification system 125 accesses support type-skill set mapping table 209 to identify a skill set based on the support type. Such a skill set is identified and updated based on user interaction periodically received from the remote device. Such a skill set is utilized to identify one or more recommended agents recommended by guided support identification system 125.

When the user initiates a live support session, guided support identification system 125 is configured to provide a list of one or more recommended agents identified based on the techniques set forth above. In addition, guided support identification system 125 is configured to identify and select one or more of preferred agents preferred by the user based on user agent preferences 220. The preferred agents are those having previous experience with the user and having ratings rated by the user, for example, higher than a predetermined threshold. Information concerning the recommended agents and/or preferred agents is then transmitted from service center 102 to the user to allow the user to select zero or one of the recommended agents and preferred agents.

In response to a user selection of zero or one of the recommended agents and preferred agents, according to one embodiment, support service system 106 is configured to generate routing context 210 that includes all the necessary information concerning the support service needed, user, associated product, associated client or manufacturer, as well as the selected agent to provide such a support service. Routing context 210 is provided to multi-channel communications and routing system 108, which will select an agent that possess the required skill set and route the routing context to the selected agent to be displayed on the agent's desktop. A communications session is then established between the user and the selected agent using a communications channel that is preferred by both the user and the client, which may be configured previously.

Thus, guided support identification system 125 is a system hosting an algorithm to analyze the data as a means of predisposition of the users request to get them to the right route (or skill) the first time without all of the common problems experienced in today's support environments such as sending a user to an inexperienced specialist to handle a complex problem, having the user transferred to another skill due to an improper route, having to conference another specialist (usually a higher cost individual) to support the user, or placing a user on hold for long periods of time while trying to contact the proper specialist to handle the interaction. In one embodiment, the user does not have to be prompted to select a channel. The system can be preconfigured to determine the channel along with the route (skill) that the user will be sent down for their support needs.

Figure 3:
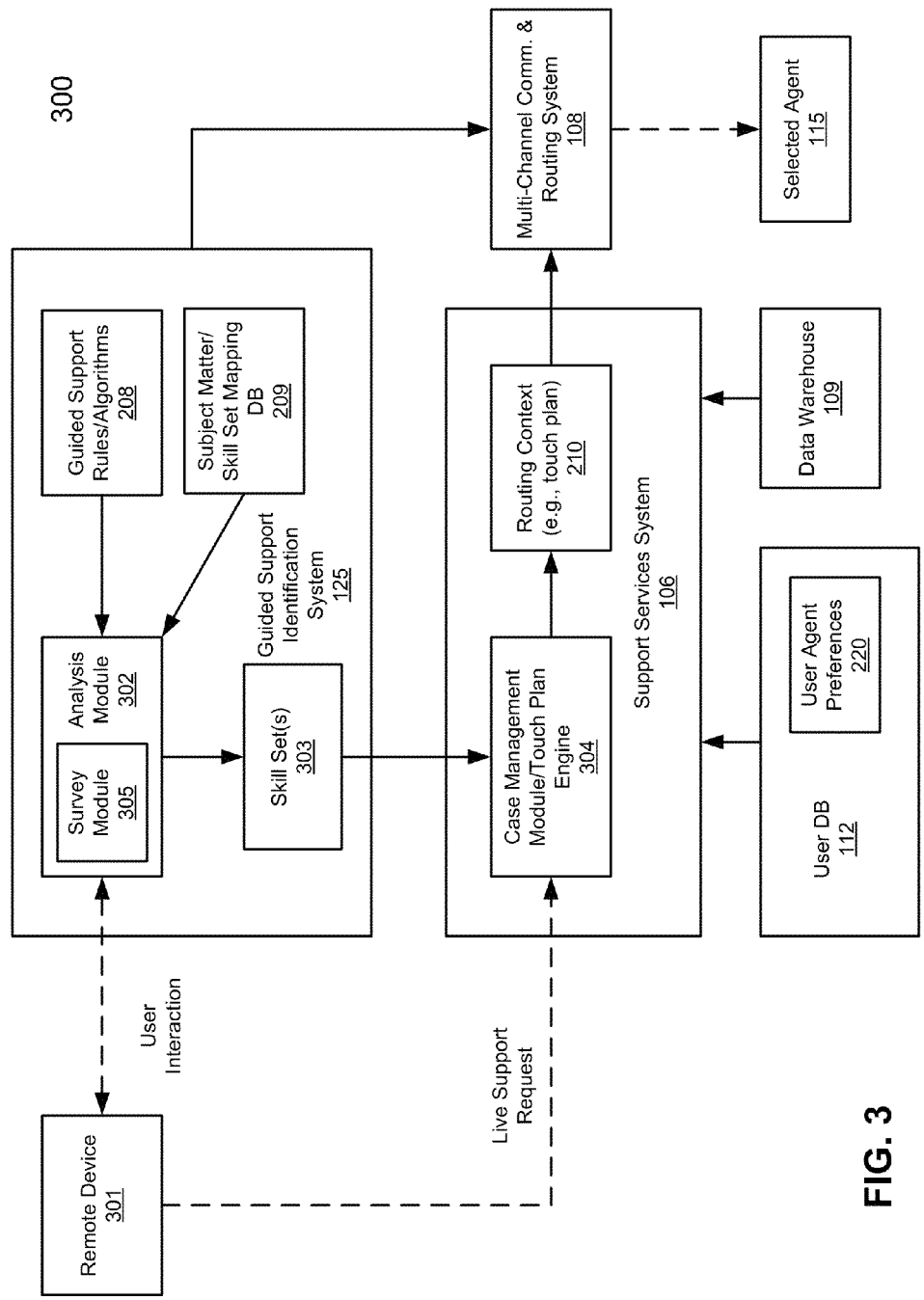
FIG. 3 is a block diagram illustrating an example of a guided support identification system according to another embodiment of the invention.

FIG. 3 is a block diagram illustrating an example of a guided support identification system according to another embodiment of the invention. Referring to FIG. 3, in one embodiment, guided support identification system 125 includes analysis module 302 to analyze user interaction with a presentation which may be captured at remote device 301. Remote device 301 may be a mobile device having an application running therein or a Web server hosting a Web page.

The presentation presented by the application or Web page may include information describing a possible solution to a problem related to a product or service. In response to the user interaction, analysis module 302 is configured to analyze and determine a support subject matter (e.g., support type) based on guided support rules or algorithms that the user may be interested in.

Guided support rules or algorithms 208 may be designed and configured specifically tailored to the representation currently navigated by the user at remote device 301. For example, guided support rules or algorithms 208 may specify the overall support subject matter for the topic of the presentation. Guided support rules or algorithms 208 may also include specific support subject matters for different parts, links, or paths within the presentation. When a user interacts with a different section of the presentation, it may yield a different support subject matter. In one embodiment, the captured user interaction may further include an amount of time the user has spent on a specific section of the presentation. Such an amount of time may be utilized as a weight factor in deciding which of the support subject matters will prevail.

Once the support subject matter has been determined, analysis module 302 is configured to determine one or more skill set 303 that are required to provide the associated support services based on support subject matter and skill set mapping database or table 209. The skill set 303 may be utilized to identify one or more agents to be recommended to the user of remote device 301 as recommended agents. Subject matter and skill set mapping table 209 includes information identifying one or more skill sets that are required to provide support services for a particular support subject matter. Subject matter and skill set mapping table 209 may optionally include information identifying one or more agents or specialists that qualify for each of the skill sets. An example of subject matter and skill set mapping table 209 is shown in FIG. 4A.

In addition, according to one embodiment, user agent preferences 220 are maintained in user database 112 associated with a user. That is, each user has its own agent preferences, respectively, for example, dependent upon previous experience of previous support sessions. Agent preferences 220 include a variety of information concerning the agents known to a particular user, such as, agent identifiers, ratings (e.g., ratings rated by all users in general and/or a specific rating rated by the particular user), and/or other information (e.g., history, products, subject matters, etc.), as shown in FIG. 4B as an example.

When the user initiates a live support from remote device 301, for example, by activating a support button or control from the presentation after navigating the presentation, a live support request is received by support service system 106. This could be a situation in which after the user has navigated a certain section of the presentation, the user does not quite understand or is not satisfied with the description. The user may want to have a live session with a specialist to further discuss further details. In one embodiment, the live support button was not available in the presentation initially. Based on the analysis of the user interaction, analysis module 302 may determine that the user may wish to have a live support session at a certain point in time. As a result, guided support identification system 125 may cause remote device 301 to present a live support control to the user, which may be in a form of a displayed button, a voice activated control, or a combination of both, to allow the user to initiate a live support session.

In response to the live support request, in one embodiment, case management module/touch plan engine 304 is configured to receive a list of one or more recommended agents provided by guided support identification system 125 and/or one or more preferred agents of the user retrieved from user agent preferences 220. A list of the recommended agents and preferred agents is transmitted to remote device 301. The list of the recommended agents and preferred agents is presented via a graphical user interface (GUI) displayed on a display of device 301, similar to the GUIs as shown in FIGS. 8A-8D to allow the user to select one of the recommended agents and preferred agents for the live support session. Note that the list of the recommended agents and preferred agents may also be transmitted by case management module/touch plan engine 304. Case management module/touch plan engine 304 and/or guided support identification system 125 may also cause remote device 301 to provide a list of communications options such as voice, chat, email, video, etc. to allow the user to select one or more of the choices to establish a live session with an agent or specialist. The list of communications options may be previously configured based on user preference and client preference, as described in the above incorporated-by-reference patent applications.

In response to a user selection of an agent (e.g., system randomly assigned agent, user-selected preferred or recommended agent) and/or a communications option, according to one embodiment, case management module or touch plan engine 304 is configured to compile and generate routing context (e.g., touch plan) 210 based on information from data warehouse 109, including user information, client information, product information, user interaction history, etc. Routing context 210 is then provided to multi-channel communications and routing system 108 to be routed to agent 115, where routing context 210 is presented to agent 115 as part of a screen pop at a desktop of the agent, such that when agent 115 communicates with the user of remote device 301, agent 115 has all the necessary information concerning the user and the product in question. Further detailed information concerning case management module/touch plan engine 304 can be found in the above incorporated-by-reference patent applications.

Furthermore, according to one embodiment, at a conclusion of the live support session, survey module 305 is configured to transmit a survey to remote device 301 to allow the user to provide a feedback, such as a rating, concerning quality of the selected agent. The feedback is utilized to update the ratings of the selected agent in general, as well as a rating of the agent as a preferred agent associated with the user. Such a rating may affect a subsequent selection of recommended agent candidates and preferred agent candidates.

According to one embodiment, while the user is navigating the presentation at remote device 301, the user interaction with the presentation is periodically transmitted from remote device and received by analysis module 302. Based on the user interaction, the support subject matter may be periodically determined and skill set 303 may be determined or updated, which may override a previous one. The received user interaction may also be stored in a database of the service center as part of user interaction history. Thus, skill set 303 may be same or different at any moment dependent upon the user interaction at the point in time. Further, skill set 303 may or may not be utilized dependent upon whether the user ends up requesting a live support during the current user session. Thus, the determined skill set 303 may only be utilized during a current user session (e.g., same browser session or same instant of an application). When the current user session ends, the determined skill set may be discarded. When a user initiates a new session, the above operations may be repeatedly performed and a new set of skills may be determined dependent upon the user interaction at the point in time.

Figure 5:
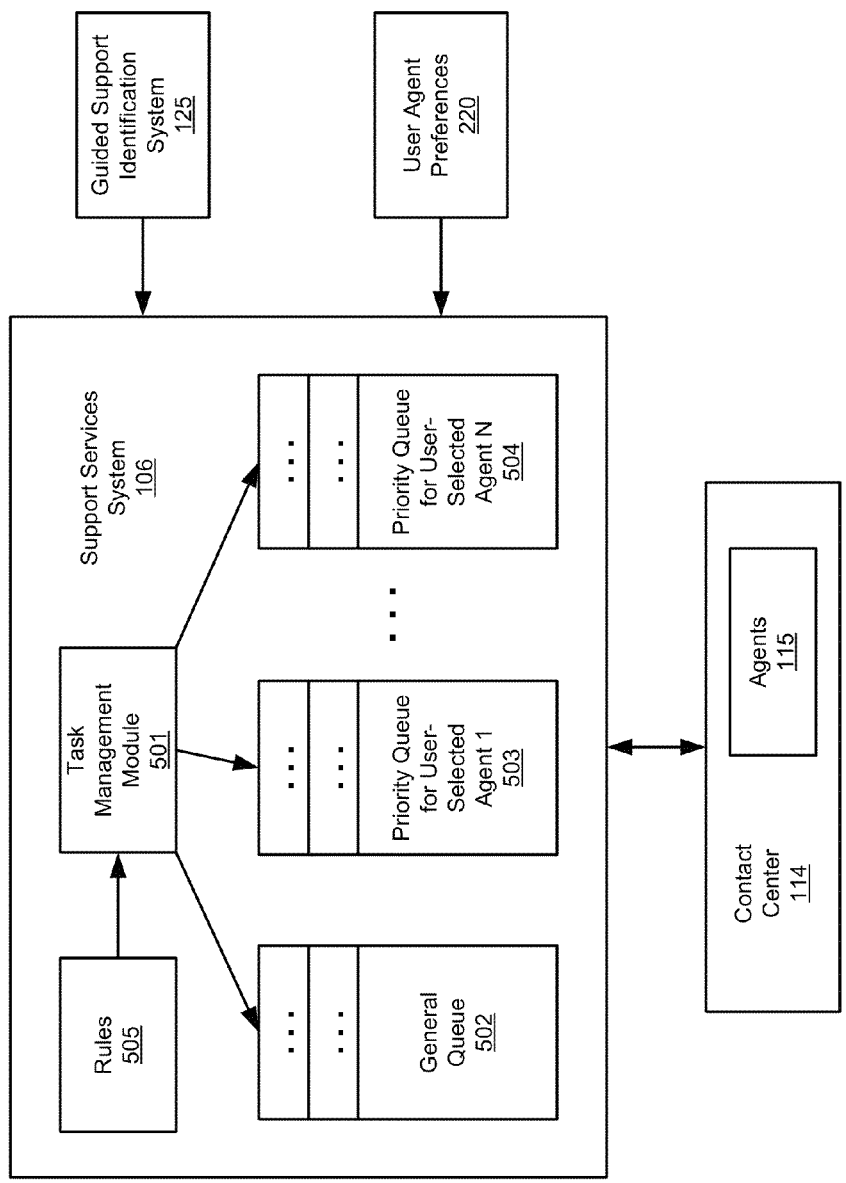
FIG. 5 is a block diagram illustrating a support service system of a service center according to another embodiment of the invention.
Figure 8B:
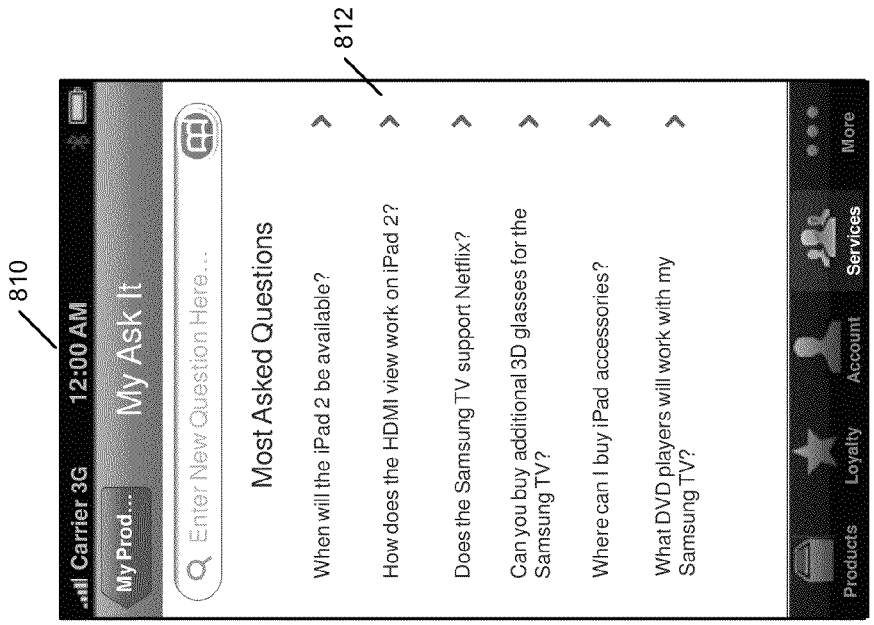
Figure 8A:
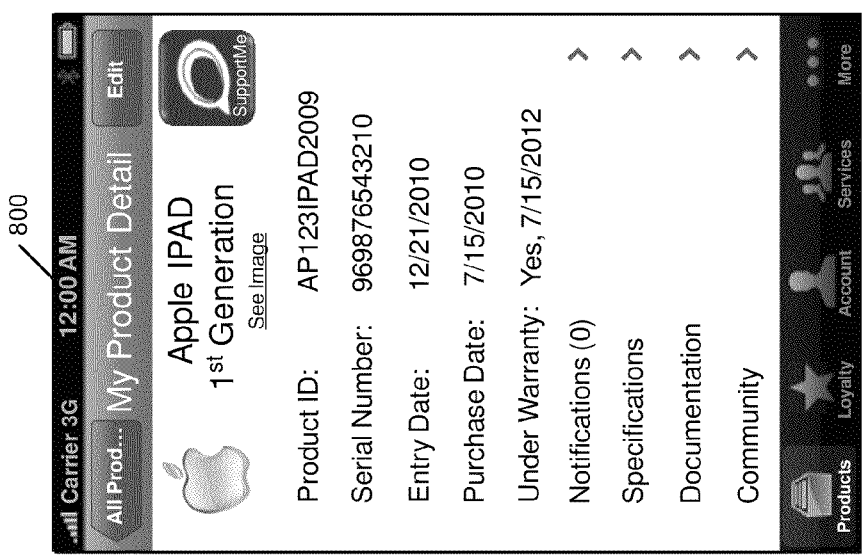

A service center typically handles thousands of support service requests and sometimes such requests have to be placed in a queue until an agent is available. According to some embodiments of the invention, various queues are implemented for pending requests for a variety of priorities. FIG. 5 is a block diagram illustrating a support service system of a service center according to another embodiment of the invention. Referring to FIG. 5, support services system 106 includes task management module 501 to manage pending support service requests in multiple queues 502-504. As described above, an agent selected for a live support session may be selected by a user (e.g., one of recommended agents and preferred agents) or by the system automatically (e.g., a randomly assigned agent). According to one embodiment, general queue 502 is utilized to store pending support service requests in which a user does not select any of the recommended agents and/or preferred agent. In this situation, the system will put the pending request in general queue 502 such that the request will be serviced when a next agent becomes available. Note that although the user does not select an agent, an agent assigned to the user may be identified and selected by the system such as the guided support identification system 125 described above. In such a situation, the task of the selected agent is put in general queue 502, where the task is handled on a first-come-first-served basis by a next available agent. Note that general queue 502 may be the one associated with a particular subject matter or support type, or a particular skill set, which may be identified by the guided support identification system.

In addition, according to one embodiment, if the user actively selects an agent, either a preferred agent or a recommended agent, the task will be put into a priority queue, such as queues 503-504, which is specifically allocated for the selected agent. In one embodiment, the selected agent typically has to finish the support requests in the corresponding queue (e.g., queues 503-504) before taking on the tasks pending in general queue 502. Alternatively, a selected agent may take on a task in general queue 502 after serving every predetermined number of tasks in its priority queue. Such priority scheme may be configurable based on a set of rules 504, which may be configured based on a variety of data, such as subject matters or support types, clients, products, skill sets, etc.

FIG. 6 is a flow diagram illustrating a method for providing support services according to one embodiment of the invention. Method 600 may be performed by service center 102 as described above. For example, method 600 may be performed by guided support identification system 125 and/or support services system 106 described above. Referring to FIG. 6, at block 601, the service center receives a request from a user for a live support session with an agent. In response to the request, at block 602, processing logic determines one or more preferred agents based on user ratings of the agents during previous user interactions with the agents. At block 603, one or more recommended agents that are capable of providing support services are identified based on their expertise. At block, 604, a list of the preferred agents and/or the recommended agents is transmitted to a remote device of the user to allow the user to select one of the preferred agents and recommended agents for the live support session. At block 605, in response to a user selection of an agent, a communications session is established between the user and the selected agent to enable the selected agent to conduct a live support session.

FIG. 7 is a flow diagram illustrating a method for providing support services according to another embodiment of the invention. Method 700 may be performed by service center 102 as described above. For example, method 700 may be performed by guided support identification system 125 and/or support services system 106 described above. Referring to FIG. 7, at block 701, the service center receives a request from a user for a live support session with an agent. In response to the request, at block 702, a communications session is established between the user and an agent selected either by the system (e.g., automatically selected agent by the system) or by the user (e.g., recommended agent or preferred agent). At the conclusion of the live support session, at block 703, a survey is transmitted to the user to allow the user to provide a feedback concerning quality of the selected agent. In response to a user rating of the selected agent, at block 704, the ratings of the selected agent are updated and at block 705, agent preference information of the user is also updated.

According to some embodiments, a mechanism for user selectable agents or specialists described above is configured to provide a user the ability to select a specialist of their choice when engaging in a support session. While a user selection is not required it can provide a user a sense of control in the resolution of a problem they are having by selecting a person who, a) appears skilled and can help quickly resolve their problem; b) work with someone they have worked with before and feels comfortable with; c) is a person they have worked with before and has a level of trust in them; and d) maintains a high rating based on the feedback of all users previously supported.

Empowering the users to drive their own destiny (to a degree) can establish a more positive support experience. After each of the support sessions a user will be given the opportunity to provide feedback on the specialist which can be seen by the next user requesting a similar support need or themselves as they engage in future support sessions. Rating feedback is cumulative for a specialist and establishes a specialist as a skilled professional as rated by the people he/she supports. This form of "crowd" based feedback ensures that the specialist maintains a level of professionalism, sensitivity to the nature of the users problem and instilling confidence in the resolutions provided to the user.

The use of the guided support identification can be an important component for a user to select a specialist from. In this model the support type is a key to identifying a subset of specialists that can directly support the particular problem that the user is encountering. While guided support identification is not necessary or required, it provides a better measure to the First Call Resolution (FCR) than to merely send a user to a specialist. This being a key metric to most customers is valuable in building customer loyalty and strengthening a customer brand. The marriage of guided support identification and consumer selected specialists provides a new level of user support personalization.

In one embodiment, initial users may start with a predetermined score (e.g., having never served a consumer selection and rating directly). In order to qualify as a user selectable specialist, a specialist may be required to have a predetermined amount (client selectable) of experience servicing a support domain. A specialist may be nominated by management (supervisor included) to be an expert candidate for consumer selection, nomination can be based on several measures of criteria, such as predetermined time in a support domain, number of user interactions processed in that domain, consistently rates high scores in management evaluations based on user interaction work, and/or contributes knowledge back into the supported domain (support articles, training, etc.)

In one embodiment, candidates may be selected by management review of data and user is adjusted accordingly. Candidates can also be selected by automation based on a specific data driven algorithm or manually by a management review board. A user after the completion of an interaction can be prompted by the system to provide a rating on the expert they just worked with. The request can come by way of feedback requested at the completion of an interaction via the web site which they initiated the support request from (e.g., click to call, chat, SMS), feedback requested at the completion of an interaction via their mobile application which they initiated the support request from, an email mailed to the user at the end of an interaction to be completed and sent back, and/or an email with a web link for the user to provide direct input to the system regarding a specialist. Other models can also be utilized such as automated outbound call or reverse IVR call, automated chat BOT initiated from an email, web site or mobile application, scoring changes thereafter are done via user feedback.

According to some embodiments, if a user provides feedback, then experts score is affected by the overall average of all users they have supported. If a user does not provide a score, then a default (possibly that of the current average) is reflected as their score. A user at any time can follow a link back to the feedback for an agent and add feedback based on no previous post for the interaction. If a post of feedback was already provided by a user, it cannot be changed. User types can be used alone as a means of user selection based merely on data provided about a specialist (must be more than one specialist). User types can be used alone as a means of user selection based merely on previous user experience with a specialist (must be more than one specialist). User types can be used in conjunction with predetermined support types so that the user is presented a list of experts skilled on the predetermined problem they are having. User types can also be used as a list of agents (must be more than one specialist) a user is happy with and wishes to call on. A user can select the specialists that they wish to be serviced by regardless of the support type and the user can have an impact to standard metrics managed by a support center.

In one embodiment, a user can have the system provide a list of specialists and just route them to the next available specialist (anyone) after a channel is selected. This is the quickest path to support resolution. The user can select from a short list of the top specialists to choose from to support them with their problem resolutions. The user can also select "general" (e.g., any or random specialist) in the case they do not see a person they would like to work with. The user can select from a short list of specialists whom have supported them in the past in resolving their need. The user can also select "general" (any specialist) in the case they do not see a person they would like to work with. The user can select the feedback model they wish to respond via, after an interaction is completed to rate/rank a specialist in the support provided to the user. The feedback models may include: 1) in-application feedback survey (mobile or web); 2) email feedback survey to user; and 3) automated voice feedback survey. The user when responding to a feedback survey may be presented a series of questions about the agent such as: i) knowledge of problem at hand; ii) patience in working with user through problem; iii) speed to resolution; iv) effective resolution of problem; and v) sensitivity to the user while working through problem.

All feedbacks from user surveys are scored and applied to a specialist rating. In case of specialist rating of "poor", dependent upon system and/or user settings, according to one embodiment, a user can opt to not to be presented for selection with the user again for any and all other support needs (permanent black list) or alternatively, not to be presented for selection until a specific rating is achieved (e.g., predetermined threshold) or a specific number of similar interactions are completed (e.g., temporary black list).

A GUI presentation of information about the specialists may be presented to users that they can utilize to select the specialist of their choice. Examples of such information includes (but not limited to): a) specialist photo; b) specialist brief biography; c) current level rating based on user feedback (rating); d) current availability (e.g., available, currently handling another user); and e) expected wait time for a specialist (based on analysis of all other users who may have queued up to for support from a specialist as well as his/her average handle time of an interaction).

According to some embodiments, if a user selects "general" the user may be routed to a skill queue (e.g., skill that was previously identified) and may be paired with the "next available" (not limited to) specialist. Other queuing and specialist selection algorithms can be utilized in place of "next available." Once the interaction is complete, the user may receive a specialist rating survey via the channel of their selection. If a user selects an "unknown" specialist the user will be routed to the specialist selected (skill was previously identified) and an interaction started. Once the interaction is complete, the user may receive a specialist rating survey via the channel of their selection. If the user provides an above average rating for the specialist, the specialist can be added to the "known" (e.g., preferred) status for this user in future interactions. If the interaction rating was poor, the specialist can be flagged and not presented to the user in future interactions. If a user selects a "known" specialist the user will be routed to the specialist selected (skill was previously identified) and an interaction started. Once the interaction is complete, the user may receive a specialist rating survey via the channel of their selection. If the user provides an above average rating for the specialist, the specialist can remain with a "known" status for this user in future interactions. If the interaction rating was poor, the specialist can be flagged and not presented to the user in future interactions.

According to one embodiment, a user can select a "recommended" specialist in which one of the "known" specialists has recommended from the team they work in. This model allows a user who has only utilized a single person to reach out to a "recommended" specialist who may provide the same level of support and professionalism as the "known" agent would have. The recommendations are created based on a set of specialist characteristics allowing an alignment of personality and capabilities to provide as similar an experience had with the "known" specialist. The system can be set up to provide the ability for multiple models. In one model, the primary difference is based on known specialists the user has worked with and other skilled specialists the user has not worked with before. In another model, the primary difference is based on known specialists the user has worked with and recommended skilled specialists that the known specialist has recommended to be similar to them which the user has not worked with before. This paring of known or preferred and recommended specialists can also be performed automatically based on specialist characteristics allowing an alignment of personality and capabilities to provide as similar an experience had with the "known" specialist.

When a specialist is presented to a user via a GUI, according to some embodiments, various information concerning the specialist can be presented including, but is not limited to, a photo of the specialist, biography of the specialist, a specialists rating level, a specialists availability, and a specialists expected wait time. Specialists can be configured visible and sorted by current level rating, current availability, expected wait time, or a combination thereof.

FIGS. 8A-8D are screenshots illustrating examples of graphical user interfaces (GUI) of an application for accessing a service center according to one embodiment of the invention. For example, GUIs as shown in FIGS. 8A-8D may be presented by application 103 of device 101 in FIG. 1. Referring to FIGS. 8A-8D, when a user launch an application from a device such as a mobile device, the application is configured to establish a connection with a service center and download registered product information from the service center representing one or more products that the user has registered with the service center. The user can activate a product page to display in details each of the registered product via GUI 800 of FIG. 8A. The user can also access certain detailed information of the registered product, such as most asked questions via GUI 810 of FIG. 8B. For example, the user can activate link 812 to access a particular answer to a question, which may be displayed via GUI 820 of FIG. 8C. From GUI 820 of FIG. 8C, if the user wishes to initiate a live support, the user can activate buttons 822 and 824 for voice and chat, respectively. Note that as described in the above incorporated-by-reference applications, the availability of buttons 822 and 824 may depend on the specific client configurations and user preferences. When the user activates one of buttons 822 and 824, GUI 830 of FIG. 8D may is presented. In GUI 830, a list of one or more preferred agents 832 and a list of one or more recommended agents 834 are displayed to allow the user to select one of the agents 832 and 834 for the live support session. Each of the agents displayed includes ratings rated by a variety of users, its expertise, availability of the agent, and/or expected time of waiting, etc. In response to a user selection of an agent from GUI 830, a communications session is established with the selected agent for the live support session.

FIG. 9 is a flow diagram illustrating a method for providing support services according to another embodiment of the invention. Method 900 may be performed by application 103 of device 101 in FIG. 1. Referring to FIG. 9, at block 901, a request is received at a mobile device for a live support session with an agent of a service center over a network concerning a product supported by the service center. In response to the request, at block 902, processing logic displays one or more preferred agents who have interacted with the user previously. At block 903, processing logic displays one or more recommended agents recommended by the service center that have experience with the subject matter in question. At block 904, in response to a user selection of one of the preferred agents and recommended agents, a communications session is established between the user and the selected agent for a live support session. At the conclusion of the live support session, at block 905, a survey is optionally provided to the user to allow the user rate quality of the selected agent and the user rating is transmitted to the service center to update the selected agent and the agent preferences of the user.

The techniques described above can be applied to a variety of scenarios. For example, a user may enter an application (e.g., mobile or Web) for self help and ask a question. The user receives a response back but it is not satisfied with the response. The user selects a live support channel (chat, voice, other). In response, problem identification is performed, for example, by the guided support identification system to help better support a users experience with a specialist. The user is then presented with a list of skilled specialists to assist based on the "support identification" type. In this example, it is assumed that the user does not want to select a specialist and clicks the "general" button to be handled by the next available specialist (e.g., a randomly selected specialist). As a result, the user is routed to a skill queue associated with the skill set required to handle the user's problem.

When a specialist becomes available and engages in a support interaction, specialist is able to resolve the user's problem. The user is prompted to rate their experience with the specialist and in this example, the user provides a rating of "very good" in all areas for the specialist. The system takes the users feedback and applies a calculation of the specialist's new rating. A next user to view the same specialist profile may see the new rating. Since the user rated the specialist "very good," the system flags the user record with the specialist so that the specialist becomes a "known" or "preferred" person and will be displayed to the user as such in a future interaction as a "preferred" or "known" specialist. Had the user feedback been poor, the specialist would be flagged and not presented to the user in a future interaction, or until a rating of a specific level is maintained, or until a specific number of highly rated interactions are achieved.

In another scenario, a user enters the application (mobile or web) for self help and asks a question, and receives a response back but it is not satisfied with the response. The user selects a live support channel (chat, voice, other) and the problem identification is performed (e.g., by guided support identification system) to help better support a users experience with a specialist. The user is then presented with a list of skilled specialists to assist based on the "support identification" type. The user reviews the list of specialists having the ability to select a specialist based on a variety of criteria, such as specialist photo, specialist brief biography, current level rating based on user feedback (rating), current availability of the user (available, currently handling another user), and/or expected wait time for a specialist (based on analysis of all other users who may have queued up to for support from a specialist as well as his/her average handle time of an interaction).

In this example, it is assumed that the user selects an unknown specialist (e.g., unknown to the user but recommended by the system) or a known (e.g., a preferred specialist) from the list. As a result, the user is routed to the specialist and engages in a support interaction. If the selected specialist is shown to currently be engaged in an interaction, the user can elect to wait for specialist until the selected specialist is available. At the conclusion of the session, the user is prompted to rate their experience with the specialist and it is assumed that the user provides a rating of "very good" in all areas for the specialist. The system takes the users feedback and applies a calculation of the specialists new rating, the next user to view the specialist profile will see the new rating. Since the user has rated the specialist as "very good," the system flags the user record with the specialist so that the specialist becomes a "known" or "preferred" person and will be displayed to the user as such in a future interaction as a preferred specialist. Had the user feedback been poor, the specialist would be flagged and not presented to the user in a future interaction, or until a rating of a specific level is maintained, or until a specific number of highly rated interactions are achieved.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing support services to users of products, the method comprising:
   providing a self-support site to present an article describing one or more possible solutions to a problem associated with a product;
   monitoring user interaction of a user with the article while the user is navigating the article, including periodically receiving signals representing the user interaction from at least one of a remote device and the self-support site within the same user session;
   determining a subject matter that the user is interested in based on an analysis of the user interaction;

determining a skill set required to provide live support services to the subject matter associated with the product;

receiving, at a computer server representing a support center, a request from the remote device for a live support session of the product supported by the support center, wherein the support center provides support services for a plurality of products on behalf of a plurality of product providers;

in response to the request, determining by the computer server a first list of one or more preferred agents that are known to the user of the remote device, wherein the preferred agents have a prior relationship with the user in a previous support session;

identifying a second list of one or more recommended agents to be recommended to the user based on a subject domain of the product, user interaction, and a skill set required to provide support to the product, wherein the recommended agents have no prior relationship with the user;

transmitting from the computer server information representing the first list of preferred agents and the second list of recommended agents to be displayed on the remote device to allow the user to select one of the preferred agents and the recommended agents for the live support session, wherein the first list of preferred agents and the second list of recommended agents are concurrently displayed on the remote device, including displaying information indicating that the preferred agents have a prior relationship with the user and that the recommended agents are not known to the user but recommended by the computer server, wherein the information transmitted to the remote device representing the preferred agents and recommended agents includes an average rating of each of the preferred agents and recommended agents, a thumbnail image of each of the preferred agents and recommended agents, an indication indicating whether each of the preferred agents and recommended agents is available at the point in time, and expected wait time for each of preferred agents and recommended agents to be available;

receiving at the computer server a user selection of an agent from the remote device that is selected from the displayed preferred agents and the recommended agents; and in response to the user selection, establishing a communications session between the remote device of the user and the selected agent to enable the selected agent to provide live support on the product.

2. The method of claim 1, wherein monitoring user interaction of the user with the article while the user is navigating the article comprises tracking events and an amount of time the user has spent browsing on a particular section of the article, wherein the tracked events and the amount of time is used as a weight factor in determining the subject matter.

3. The method of claim 2, wherein the preferred agents presented to the user are selected from a plurality of preferred agents that have ratings higher than a predetermined threshold, and wherein preferred agents having ratings below the predetermined threshold are not presented to the user.

4. The method of claim 3, further comprising:

transmitting a survey of the selected agent to the remote device to allow the user to rate the selected agent after the live support session is completed;

in response to a user rating of the selected agent, updating ratings of the selected agent in an agent database and in a preferred agent database associated with the user, wherein the ratings are utilized for future recommendations of agents;

if the selected agent is a recommended agent and the user rating is greater than or equal to a second predetermined threshold, designating the selected agent as a preferred agent in the preferred agent database for the user; and if the user rating of the selected agent is below the second predetermined threshold, marking in the preferred agent database of the user the selected agent not to be presented to the user subsequently.

5. The method of claim 1, further comprising in response to the user selection of the preferred agent, queuing the request for live support session in a priority queue associated with the selected agent, wherein requests pending in the priority queue specifically requested a live support session with the selected agent from a plurality of users, wherein the priority queue is one of a plurality of priority queues maintained by the server, each priority queue corresponding to a specific agent.

6. A non-transitory machine-readable storage medium having instructions stored therein, which when executed by a machine, cause the machine to perform a method for providing support services to users of products, the method comprising:

providing a self-support site to present an article describing one or more possible solutions to a problem associated with a product;

monitoring user interaction of a user with the article while the user is navigating the article, including periodically receiving signals representing the user interaction from at least one of a remote device and the self-support site within the same user session;

determining a subject matter that the user is interested in based on an analysis of the user interaction;

determining a skill set required to provide live support services to the subject matter associated with the product;

receiving, at a computer server representing a support center, a request from the remote device for a live support session of the product supported by the support center, wherein the support center provides support services for a plurality of products on behalf of a plurality of product providers;

in response to the request, determining a first list of one or more preferred agents that are known to the user of the remote device, wherein the preferred agents have a prior relationship with the user in a previous support session;

identifying a second list of one or more recommended agents to be recommended to the user based on a subject domain of the product, user interaction, and a skill set required to provide support to the product, wherein the recommended agents have no prior relationship with the user;

transmitting information representing the first list of preferred agents and the second list of recommended agents to be displayed on the remote device to allow the user to select one of the preferred agents and the recommended agents for the live support session, wherein the first list of preferred agents and the second list of recommended agents are concurrently displayed on the remote device, including displaying information indicating that the preferred agents have a prior relationship with the user and that the recommended agents are not known to the user but recommended by the computer server, wherein the information transmitted to the remote device representing the preferred agents and recommended agents includes an average rating of each of the preferred agents and recommended agents, a thumbnail image of each of the preferred agents and recommended agents, an indication indicating whether each of the preferred agents and recommended agents is available at the point in time, and expected wait time for each of preferred agents and recommended agents to be available;

receiving at the computer server a user selection of an agent from the remote device that is selected from the displayed preferred agents and the recommended agents; and in response to the user selection, establishing a communications session between the remote device of the user and the selected agent to enable the selected agent to provide live support on the product.

7. The non-transitory machine-readable storage medium of claim 6, wherein monitoring user interaction of the user with the article while the user is navigating the article comprises tracking events and an amount of time the user has spent browsing on a particular section of the article, wherein the tracked events and amount of time is used as a weight factor in determining the subject matter.

8. The non-transitory machine-readable storage medium of claim 7, wherein the preferred agents presented to the user are selected from a plurality of preferred agents that have ratings higher than a predetermined threshold, and wherein preferred agents having ratings below the predetermined threshold are not presented to the user.

9. The non-transitory machine-readable storage medium of claim 8, wherein the method further comprises:
- transmitting a survey of the selected agent to the remote device to allow the user to rate the selected agent after the live support session is completed;
- in response to a user rating of the selected agent, updating ratings of the selected agent in an agent database and in a preferred agent database associated with the user, wherein the ratings are utilized for future recommendations of agents;
- if the selected agent is a recommended agent and the user rating is greater than or equal to a second predetermined threshold, designating the selected agent as a preferred agent in the preferred agent database for the user; and
- if the user rating of the selected agent is below the second predetermined threshold, marking in the preferred agent database of the user the selected agent not to be presented to the user subsequently.

10. The non-transitory machine-readable storage medium of claim 6, wherein the method further comprises in response to the user selection of the preferred agent, queuing the request for live support session in a priority queue associated with the selected agent, wherein requests pending in the priority queue specifically requested a live support session with the selected agent from a plurality of users, wherein the priority queue is one of a plurality of priority queues maintained by the server, each priority queue corresponding to a specific agent.

11. A data processing system, comprising:
a processor; and
a memory coupled to the processor for storing instructions, which when executed from the memory, cause the processor to
provide a self-support site to present an article describing one or more possible solutions to a problem associated with a product,
monitor user interaction of a user with the article while the user is navigating the article, including periodically receiving signals representing the user interaction from at least one of a remote device and the self-support site within the same user session,
determine a subject matter that the user is interested in based on an analysis of the user interaction,
determine a skill set required to provide live support services to the subject matter associated with the product,
receive a request from the remote device for a live support session of the product supported by the service center, wherein the data processing system provides support services for a plurality of products on behalf of a plurality of product providers,
in response to the request, determine a first list of one or more preferred agents that are known to the user of the remote device, wherein the preferred agents have a prior relationship with the user in a previous support session, identify a second list of one or more recommended agents to be recommended to the user based on a subject domain of the product, user interaction, and a skill set required to provide support to the product, wherein the recommended agents have no prior relationship with the user,
transmit information representing the first list of preferred agents and the second list of recommended agents to be displayed on the remote device to allow the user to select one of the preferred agents and the recommended agents for the live support session, wherein the first list of preferred agents and the second list of recommended agents are concurrently displayed on the remote device, including displaying information indicating that the preferred agents have a prior relationship with the user and that the recommended agents are not known to the user but recommended by the computer server, wherein the information transmitted to the remote device representing the preferred agents and recommended agents includes an average rating of each of the preferred agents and recommended agents, a thumbnail image of each of the preferred agents and recommended agents, an indication indicating whether each of the preferred agents and recommended agents is available at the point in time, and expected wait time for each of preferred agents and recommended agents to be available,
receive a user selection of an agent from the remote device that is selected from the displayed preferred agents and the recommended agents, and
in response to the user selection, establish a communications session between the remote device of the user and the selected agent to enable the selected agent to provide live support on the product.

12. The system of claim 11, wherein monitoring user interaction of the user with the article while the user is navigating the article comprises tracking events and an amount of time the user has spent browsing on a particular section of the article, wherein the tracked events and the amount of time is used as a weight factor in determining the subject matter.
determine the skill set required to provide live support services to the subject matter associated with the product.

13. The system of claim 12, wherein the preferred agents presented to the user are selected from a plurality of preferred agents that have ratings higher than a predetermined threshold, and wherein preferred agents having ratings below the predetermined threshold are not presented to the user.

14. A computer-implemented method for providing support services to users of products, the method comprising:

receiving, at a mobile device, information representing one or more preferred agents and one or more recommended agents from a support center over a network, wherein the preferred agents are known to a user of the mobile device and have a prior relationship with the user, wherein each of the preferred agents was selected and interacted with the user during a previous live support session, and wherein each of the preferred agents was rated by the user at a conclusion of a previous live support session, wherein the recommended agents are recommended by the service center and the recommended agents have no prior relationship with the user, wherein each of the recommended agents is selected by the support center based on a subject domain of the product, user interaction, user feedback rating, and a skill set required to provide support to the product, and wherein the support center provides support services for a plurality of products on behalf of a plurality of product providers;

displaying in a first display area of a display of the mobile device the one or more preferred agents, including displaying information indicating that the one or more preferred agents are known to a user of the mobile device;

concurrently displaying in a second display area of the display of the mobile device the one or more recommended agents to allow the user to select one of the preferred agents and recommended agents;

for each of the preferred agents and recommended agents, displaying an average rating of the agent, a thumbnail image of the agent, an indication indicating whether the agent is available at the point in time, and expected wait time for the agent to be available; and in response to a user selection of one of the preferred agents and recommended agents, establishing a communications session with the selected agent via the support center for conducting a live support session concerning a product.

15. The method of claim 14, wherein the preferred agents presented to the user are selected from a plurality of preferred agents that have ratings higher than a predetermined threshold.

16. The method of claim 15, wherein preferred agents having ratings below the predetermined threshold are not presented to the user.

* * * * *